Aug. 7, 1956
K. LUFT
2,758,216
APPARATUS FOR PERFORMING QUANTITATIVE
ANALYSIS OF GASEOUS MIXTURES
Filed Dec. 4, 1951
2 Sheets-Sheet 1
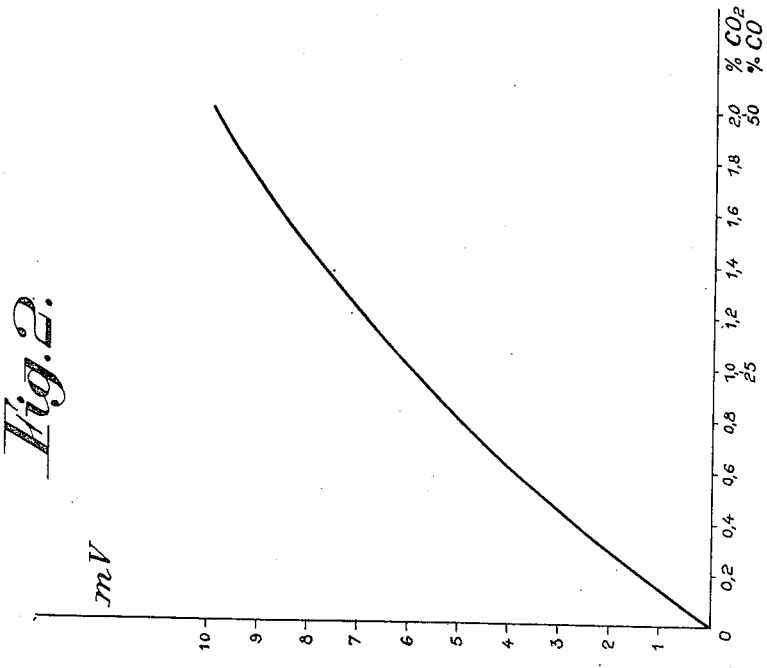
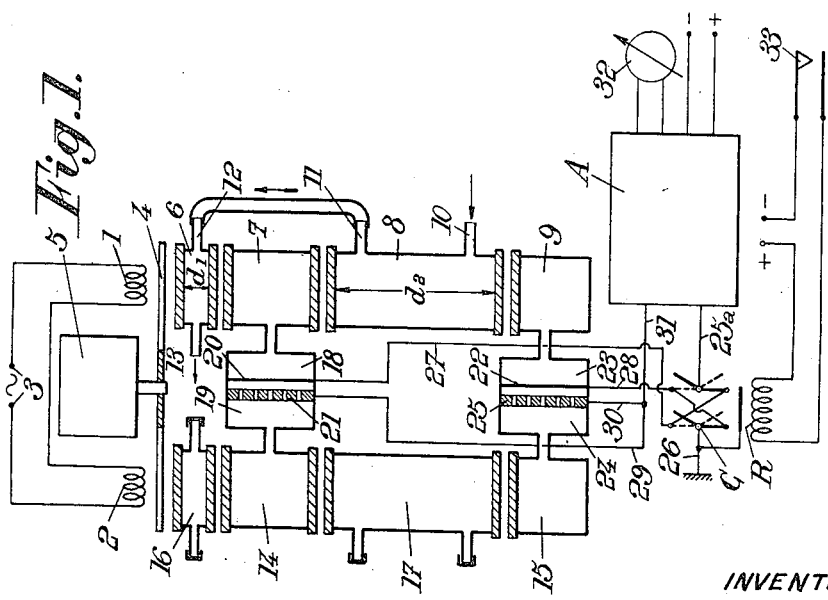
INVENTOR
KARL LUFT
BY
Bailey, Stephens & Huettig
ATTORNEYS Aug. 7, 1956

K. LUFT 2,758,216

APPARATUS FOR PERFORMING QUANTITATIVE
ANALYSIS OF GASEOUS MIXTURES

Filed Dec. 4, 1951

INVENTOR
KARL LUFT
BY
Bailey, Stephens & Huettig
ATTORNEYS

United States Patent Office 2,758,216
Patented Aug. 7, 1956

2,758,216

APPARATUS FOR PERFORMING QUANTITATIVE ANALYSIS OF GASEOUS MIXTURES

Karl Luft, Massy, France, assignor to Office National d'Etudes et de Recherches Aéronautiques (O. N. E. R. A.), Chatillon-sous-Bagneux (Seine), France, a society of France Application December 4, 1951, Serial No. 259,867

Claims priority, application France December 11, 1950

9 Claims. (Cl. 250—43.5)

The present invention relates to gas analyzers working by absorption of radiations and it is more especially, but not exclusively, concerned with infra-red ray absorption gas analyzers.

These analyzers are based upon the property of certain fluids, and in particular gases, of absorbing, from a beam of rays, and in particular of infra-red rays, passing therethrough, the rays having wavelengths within a predetermined range. Such analyzers include a source which supplies two beams of rays of at least approximately the same composition, concerning the wavelengths, and the same intensity. One of these ray beams is made to pass through the gas mixture to be analyzed. This beam, hereinafter called "measurement beam," then enters a chamber called "receiving chamber" filled either with only one of the gases present in said mixture, or with this gas (hereinafter called "active gas") mixed with another gas having no power of absorption of the rays of the beam, this last mentioned gas being therefore "inactive" for the particular measurement to be made. The active gas of the receiving chamber absorbs at least approximately the whole of the rays of a wavelength corresponding to said active gas which have not already been absorbed when the beam passed through the mixture to be analyzed. The other ray beam, hereinafter called "comparison beam," passes directly (i. e. without having undergone absorption by any gas or gas mixture) into another receiving chamber filled with the same active gas as the first mentioned chamber, where the rays of a wavelength corresponding to said active gas are absorbed. As the ray absorption is greater in the second mentioned chamber, the difference in the physical phenomena taking place in the two chambers, respectively (difference in temperature, in pressure, etc.), serves to determine the amount of gas identical to the active gas which is present in the gas mixture to be analyzed.

The difference in question may be measured by means of any differential device and in particular by means of a diaphragm condenser the diaphragm element of which is interposed between the two receiving chambers, through which the measurement beam and the comparison beam pass, respectively.

It has already been proposed to provide gas analyzers of this kind which are capable of measuring the relative amounts of several components of the mixture to be analyzed. Such analyzers include, mounted in series across the paths of the ray beams, a plurality of receiving chambers containing active gases respectively identical to the components of the mixture to be analyzed.

The object of my invention is to provide a gas analyzer of this type which is better adapted to meet the requirements of practice than those known at the present time.

As a matter of fact, in known analyzers, the respective receiving chambers are disposed one immediately behind the other and the ray beam passes first through a single chamber located ahead of said receiving chambers and containing a sample of the mixture to be analyzed, so that the thickness of the mixture sample through which passes the measurement beam is the same for the measurement of all the components of said mixture. However, the thickness of the sample of mixture through which the measurement ray beam is made to pass should advantageously be adapted to the nature and to the maximum concentration of every particular gas component to be detected and measured. If too small a thickness is used, the measuring effect is too weak. If, on the contrary, too great a thickness is used, the calibrating curves that are obtained (that is to say curves indicating the intensity of the physical effect resulting from the absorption of rays of a given wavelength range as a function of the concentration of the absorbing gas) become, for high concentrations, lines so close to the horizontal that accurate measurements are impossible.

In order to obviate these drawbacks, according to my invention, I dispose, across the path of the measurement beam, alternately one chamber containing a sample of the mixture to be analyzed and one receiving chamber containing one of the gasses included in this mixture, whereby the sum of the thicknesses of the mixture samples located ahead of a given receiving chamber can be given a value which is at least approximately the best possible one for the active gas of this receiving chamber. For instance, the first receiving chamber will contain that of the component gases of the mixture which requires, for correct analysis, the minimum thickness of the sample of mixture to be crossed by the measurement light beam before this beam reaches the receiving chamber, and the first sample chamber, located immediately before this first receiving chamber, will be given this thickness. The other receiving chambers will be disposed in the order of the corresponding greater and greater thicknesses of mixture sample required for obtaining at least approximately the most favorable ray absorption. As for the sample chambers located behind the first one, they are given respective thicknesses such that each one, added up to the sum of those of the sample chambers located ahead of it, gives at least approximately the best possible value for the absorption of the rays corresponding to the gas which is provided, as active gas, in the next receiving chamber.

Other features of my invention will result from the following detailed description of some specific embodiments thereof, given merely by way of example, with reference to the accompanying drawings, in which:

Fig. 1 diagrammatically shows an analyzer made according to my invention;

Fig. 2 shows a calibration curve illustrating the operation of the apparatus of Fig. 1;

Figure 3:
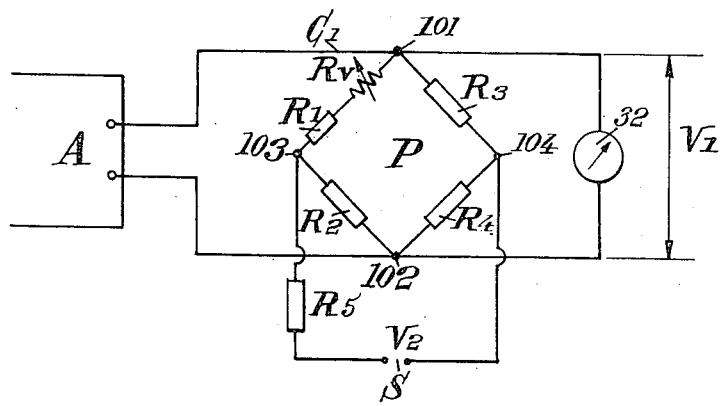
Fig. 3 shows the electric lay-out of density variation compensating means to be used in combination with the apparatus of Fig. 1.
Figure 4:
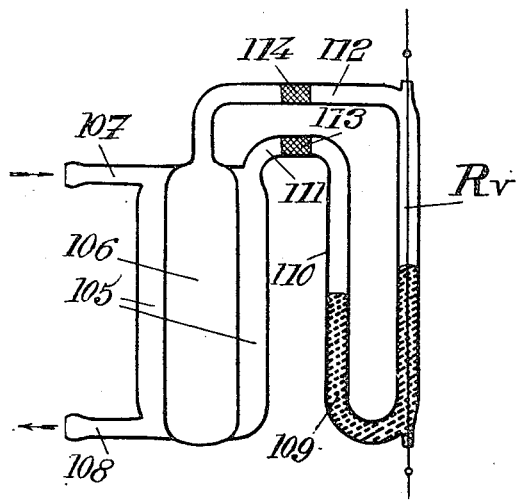
Fig. 4 shows a variable resistance device adapted to be used as an element of the structure of Fig. 3.

The apparatus of Fig. 1 includes a source of infra-red rays capable of supplying two beams of such rays of at least approximately the same composition, concerning the wavelengths, and the same intensity. For instance, this source includes two infra-red radiators 1 and 2 supplied with current from a source diagrammatically indicated at 3, these radiators being arranged to emit two beams of infra-red rays, the beam produced by radiator 1 being the measurement beam while that produced by radiator 2 is the comparison or reference beam.

Preferably, these beams are periodically cut off by a rotary sector 4 driven by a motor 5.

According to my invention and as shown by the drawing, in order to measure two components of the mixture to be analyzed, the measurement beam is made to pass successively through a first chamber 6 containing this mixture, then through a receiving chamber 7 containing an active gas constituted by one of these two components, then through a second chamber 8 containing the mixture to be analyzed and, finally, through a second receiving chamber 9 containing an active gas constituted by the second of these components. If the mixture contained other components, for instance a third and a fourth component, the beam would be made to pass through a third and a fourth stage including each a chamber containing the mixture to be analyzed and a chamber containing as active gas, the third or fourth components.

The vessels forming the chambers 6, 8 for the mixture to be analyzed may be interconnected for the flow in series of the mixture to be analyzed through these chambers. Such an arrangement is shown by Fig. 1, where the mixture to be analyzed enters chamber 8 through inlet 10, leaves it through outlet 11, then flows to chamber 6 through an inlet 12 and leaves this chamber through an outlet 13.

The comparison or reference beam emitted by radiator 2 is made to pass through two receiving chambers 14 and 15 containing the same active gases respectively as receiving chambers 7 and 9. This beam does not pass through any space containing the mixture to be analyzed.

The apparatus shown by Fig. 1 includes vessels 16 and 17 located similarly to vessels 6 and 8 and of the same dimensions respectively. But these vessels 16 and 17 are provided merely for the sake of symmetry and they are filled with a gas which does not absorb the rays which are to be absorbed by the components of the mixture to be analyzed.

Concerning the choice of the thicknesses (heights) of vessels 6 and 8, it is based on the following considerations:

Infra-red rays are absorbed by a gas approximately in accordance with the Beer formula, to wit:

$$A = I_0 - I_1 = I_0(1 - e^{-kcd})$$

in which:

$I_0$ is the radiation entering the vessel which contains the gas mixture;
$I$ is the radiation leaving this vessel;
$k$ is the coefficient of absorption of the gas to be measured;
$c$ is the concentration of this gas;
$d$ is the thickness of the absorbing mass of gas;
$e$ is the base of natural logarithms.

For every gas to be detected and measured, there is a thickness $d$ of the mass of absorbing mixture which is the most favorable one for analysis based upon the absorption of infra-red rays by this gas. If the thickness of this mass is much lower than this optimum value, the measurement effect is too weak and if the thickness is too great, measurements are carried out in the saturation zone of the exponential law, where the various measurement results are difficult to separate.

It is therefore important to provide, for every component of the mixture to be analyzed, a thickness of the mixture as near as possible to the most favorable value.

Accordingly, the first receiving chambers, to wit 7 and 14, contain as active gas the mixture component for which the thickness $d$ of the preceding sample chamber is minimum. This sample chamber 6 is therefore given a thickness $d_1$ (Fig. 1) equal to this minimum value.

As for chamber 8, it is made of a thickness (i. e. of a height) $d_2$ such that the sum of $d_1$ and $d_2$ has at least approximately a value equal to the optimum thickness of the mass of mixture to be provided ahead of receiving chamber 9 which contains a gas identical to the second component.

Preferably, in the case where two components are to be measured, the products $k_1 c_1 d_1$ and $k_2 c_2 (d_1 + d_2)$ are chosen approximately equal, $k_1$ and $k_2$ being approximately the coefficients of absorption of the two components to be measured (i. e. of the gases present in chambers 7 and 9 respectively, and $c_1$ and $c_2$ being the mixed concentrations of these two components in the gaseous mixture.

In this case, the order in which the respective receiving chambers are placed is determined by the decreasing order of the products $kc$ corresponding to the component gases placed in said chambers.

If, for instance, the gas to be analyzed includes an amount of CO ranging from 0% to 50% and an amount of $CO_2$ ranging from 0% to 2%, receiving chamber 7 is filled with CO and receiving chamber 9 is filled with $CO_2$ and $d_1$ may be chosen equal to 1 mm. and $d_2$ to 10 mm., whereby the thickness of mixture through which the measurement beam is to pass before entering receiving chamber 9, which contains $CO_2$, is equal to eleven times the thickness of mixture through which the same beam is to pass before entering receiving chamber 7, which contains CO. I thus obtain, both for the measurement of CO and for that of $CO_2$, accurate and quite different values indicating the proportions of these two gases in the mixture for the whole range of concentrations to be measured.

Of course, the above stated numerical values are given merely by way of example.

Fig. 2 shows, for this example, the calibrating curve, that is to say the curve which represents, as a function of the $CO_2$ or CO concentration, the importance of the physical phenomenon, expressed in millivolts (mv.), due to the absorption of corresponding infra-red wave bands by the respective CO and $CO_2$ components of the mixture to be examined. This curve has the same shape for both components since $k_1 c_1 d_1$ was chosen approximately equal to $k_2 c_2 (d_1 + d_2)$.

As for vessels 16 and 17, interposed across the path of the comparison beam and filled with a gas which does not absorb the infra-red rays absorbed by the active gases of the receiving chambers, they are made, for reasons of symmetry, of the same thicknesses (i. e. heights) as vessels 6 and 8.

In order to measure the difference between the physical phenomena produced in corresponding receiving chambers, 7 and 14 on the one hand and 9 and 15 on the other hand, which difference makes it possible to determine the concentration of the component gas to be measured, all sorts of means may be employed. However, it seems particularly advantageous to make use, for this purpose, as already known, of diaphragm condensers. Thus, the receiving chambers 7 and 14 are connected with respective compartments 18 and 19 separated from each other by a diaphragm 20 which constitutes one of the armatures of a condenser, the other armature being constituted by a plate 21 provided with a multiplicity of orifices extending therethrough and located in compartment 19.

Under the effect of the pressure difference between chambers 7 and 14, this diaphragm 20 undergoes periodical deformations the amplitude of which is a function of the proportion, in the mixture to be analyzed, of the component identical to the active gas present in chambers 7 and 14. The periodicity of the movements of diaphragm 20 corresponds to the rotation of shutter 4. This diaphragm condenser 20—21 therefore produces periodically varying differences of potential the amplitude of which corresponds to the amplitude of movement of diaphragm 20 and which therefore make it possible to measure the proportion of the component gas in the mixture.

Concerning now receiving chambers 9 and 15, I interpose between them a similar diaphragm condenser, including a diaphragm 22 forming a deformable partition between two chambers 23 and 24 respectively connected with chambers 9 and 15. Diaphragm 22 constitutes one of the armatures of the condenser, whereas plate 25, provided with a multiplicity of orifices extending therethrough, constitutes the other armature.

In order to measure the periodical variations of potential of these two diaphragm condensers, I may of course make use of two distinct measurement devices each of which is connected with one of the condensers respectively.

However, according to my invention, it is particularly advantageous to provide for both of the diaphragm condensers 20—21 and 22—25 a single amplifier which controls an indicator device, and to insert between these condensers and the amplifier a suitable switch capable of coupling alternately one and the other of said condensers with said amplifier.

According to a preferred embodiment, the switch device is interposed between the feed voltage and one of the armatures of each of the condensers, the other armature of each of these condensers being permanently connected with the input of the amplifier, that is to say with the grid of the input tube thereof. Such an arrangement of the switch makes it unnecessary to change the connections between the condenser armatures and the input of the amplifier, which would be difficult due to the excellent insulation required for these connections.

Thus, according to Fig. 1, switch C includes two pairs of terminals. One terminal of one pair is connected, through a conductor 25a, with the feed voltage of amplifier device A, diagrammatically represented in Fig. 1 by a rectangle and the arrangement of which may be the same as that disclosed in my U. S. patent application Ser. No. 64,084, filed December 8, 1948, for "Quantitative Analysis Apparatus in Particular for Gaseous Mixtures," now abandoned, and the other terminal of this pair is earthed through a conductor 26. The terminals of the other pair are connected to the armatures 20 and 22 of the diaphragm condensers, through conductors 27 and 28. The movable part of the switch can assume two different working positions, in one of which (shown in solid lines) it connects conductor 27 with conductor 25a whereas conductor 28 is earthed through 26. In the other position (shown in dotted lines), conductor 28 is connected with conductor 25a whereas conductor 27 is earthed through 26. Furthermore, the armatures 21 and 25 of the respective condensers are permanently connected, respectively through conductors 29 and 30, with a conductor 31 leading to the input of amplifier device A, that is to say to the grid of the input tube (not shown) of said amplifier device. The amplified impulses supplied by the amplifier device are indicated by a millivoltmeter 32.

In the position of switch C shown in solid lines in Fig. 1, armature 20 is connected to the feed voltage through 25a, so that the amplifier amplifies and transmits to millivoltmeter 32 the signals of condenser 20—21, whereas the signals of condenser 22—25 are not transmitted since the armature 22 thereof is earthed through 26.

In the other position of switch C (dotted lines), the signals from condenser 22—25 are amplified and transmitted to millivoltmeter 32, whereas condenser 20—21 is no longer connected to the indicator circuit.

Switch C is preferably operated by means of a relay diagrammatically shown at R and controlled through a contact 33.

When it is desired to record over a period of time the concentrations of the two components to be measured, a recording device (not shown) may be used which gives two curves and which operates, every time shifting from one curve to the other takes place, a switch such as 33.

I will now describe another feature of my invention, relating to the provision of the means necessary for compensating for variations of density of the gas mixture to be analyzed.

It should be noted here that the variations of density which may modify the measurement indication are chiefly due to pressure or temperature variations.

These compensating means include a shunt mounted across the indicator instrument 32 in the circuit $C_1$ which connects the output of amplifier A with this instrument (Fig. 3). Due to the provision of this shunt, the total resistance of circuit $C_1$ is essentially constituted by the resistance $R_i$ of instrument 32 and the resistance $R_s$ of the shunt.

The whole is arranged in such manner that, for a given value of the resistance $R_s$ of the shunt and for a given density of the gas to be analyzed, for instance its density when it is at a temperature of 20° C. and at a pressure of 760 mm. of mercury, the indications of instrument 32 correspond correctly to the concentrations to be measured. The predetermined value of the resistance of the shunt which corresponds to the above mentioned density value, considered as normal density, will be hereinafter called normal resistance of the shunt.

The resistance $R_s$ of the shunt must vary proportionally to the variation of the density from its normal value, that is to say if the density drops below its normal value, the resistance of the shunt must be brought a value above its normal value, this increase of the resistance involving an increase of the total resistance of circuit $C_1$ and consequently an increase of the measurement voltage indicated by instrument 32. Inversely, if the density of the gas to be analyzed rises above its normal value, the resistance of the shunt must be reduced to a value below its normal value, which involves a reduction of the value of the total resistance of circuit $C_1$ and a reduction of the measurement voltage indicated by instrument 32.

However, the compensating effect obtained with a mere shunt is correct only when the zero of electric instrument 32 corresponds to zero concentration of the gas component to be measured, but an ordinary shunt no longer gives correct results when the zero of instrument 32 corresponds to a concentration different from zero. In other words, a simple shunt gives correct results if the various positions of the pointer of instrument 32 between zero and the end of the scale correspond to concentrations ranging for instance from zero to 20%. But they are no longer correct when the indications of this instrument 32 correspond to concentrations ranging from 10 to 20%. In the first case, the error, for a relative variation of density of for instance 1%, is zero for a concentration equal to zero and is for instance 1% when the pointer is at the end of the scale. In the second case, on the contrary, the errors due to the same relative variation of 1% of the density range from 1% to 2% according as the concentration ranges from 10 to 20%. An ordinary shunt would not be capable of correcting this last range of errors. The insufficiency of ordinary shunts is the greater as the range of concentrations indicated by an instrument 32 is narrower for the whole scale of this instrument, for instance if the concentration values to be indicated by the instrument for its whole range of operation, i. e., for its whole scale, range from 30 to 40%. In this case, the errors due to a 1% variation of the density range from 3 to 4% of the whole range of the instrument scale.

According to my invention, I avoid this drawback by making use of an auxiliary voltage which is added to or subtracted from the main voltage $iR$ acting upon measurement instrument 32.

For this purpose, according to a particularly advantageous embodiment of my invention, the shunt is constituted by a bridge P of the kind of a Wheatstone bridge, one of the branches of which includes a resistance $R_v$ variable as a function of the density of the gas to be measured, the ends 101 and 102 of one of the diagonals of bridge P being connected in circuit $C_1$ across instrument 32, whereas the ends 103, 104 of the other diagonal are connected to the terminals of an auxiliary source S which applies an auxiliary voltage $V_2$ to said diagonal. Preferably, I mount a resistance $R_5$ in series with S, to give a very low value to the current produced by the auxiliary voltage.

In the example shown by Fig. 3, the variable resistance $R_v$ is located in branch 101—103. This resistance may be the only one in this branch or it may be in series with a constant resistance $R_1$ inserted in said branch. The resistances of the three other branches 102—103, 103—104 and 104—101 have constant values and are designated by $R_2$, $R_4$ and $R_5$. When the density of the gas is the normal density (temperature 20° C., pressure 760 mm. of mercury), resistance $R_v$ is given a value such that $R_1+R_v=R_2$. On the other hand, $R_3$ is always equal to $R_4$. Finally, the whole of the shunt constituted by bridge P has, for the normal value of $R_v$, a resistance $R_5$ such that voltage $V_1=IR$ corresponds without any correction to the concentrations to be measured. The indications of instrument 32 are therefore correct without an auxiliary voltage being added to value $Ir$ or subtracted therefrom.

When the density of the gas becomes different from the normal density, resistance $R_v$ becomes higher for a lower density, or lower for a higher density.

The bridge then has two functions. On the one hand it produces a compensating voltage and, on the other hand, it modifies the total resistance of circuit $C_1$.

Let it be supposed that the zero indication of instrument 32 corresponds to a concentration of 30% and that the maximum indication of this instrument corresponds to a concentration of 40%. In this case, a variation of the density of 1% would involve an error of 3% for the lowest indications of instrument 32 and an error of 4% for the highest indications of this instrument. The auxiliary voltage $V_2$ must then be such that it produces a compensating voltage which reaches $\mp 3\%$ of the total scale range of instrument 32 for a variation of density of $\pm 1\%$, whereas the resistance $R_s$ of the shunt must vary in such manner that the total resistance R of circuit $C_1$ varies within a range of $\mp 1\%$. I thus obtain a correction of 3% for the lowest indications of the instrument (concentration of about 30%) and of 4% for the highest indications of said instrument (concentration of about 40%), these corrections being always made in the correct direction.

I will now give, merely by way of indication, some numerical values corresponding to a particular case.

$R_v$ (normal or mean value) $=20\Omega$
$\Delta R_v$ (for a density variation of 1%) $=0.9\Omega$
$R_1=10\Omega$
$R_2=30\Omega$
$R_3=R_4=300\Omega$ Furthermore, millivoltmeter 32 has, in this example, a resistance $R_i$ of $100\Omega$.

Finally, for measuring a concentration between 30 and 40% (the error to be corrected being, for a density variation of 1%, somewhere between 3% and 4%) $V_2$ is, in this case, equal to 2.5 volts and $R_5$ to $2,000\Omega$.

The value of the auxiliary voltage to be applied at points 103 and 104 varies in accordance with the range of concentrations that corresponds to the whole scale of instrument 32. This voltage is lower when this range is from 10 to 20% than when it is from 20 to 30% or from 30 to 40%.

In order to make it possible for instrument 32 to make measurements for different ranges of concentrations, it suffices to vary either the voltage of source S or the value of resistance $R_5$.

Advantageously, the means for adjusting either source S or resistance $R_5$ are combined with the means for varying the range of measurements, so that this adaptation takes place automatically.

It is pointed out that variation of the range within which the measurements are made is obtained, in the case of a gas analyzer of the type above indicated, by adjusting the measurement and/or comparison radiations of this instrument.

Concerning variable resistance $R_v$, it may be controlled in any suitable way as a function of the density of the gas to be measured. However, according to a feature of my invention, I make use for this purpose of a device including two vessels 105 and 106 disposed one inside the other. The gas to be analyzed enters at 107 into vessel 105 and leaves it at 108. The pressure inside this vessel is therefore that of the gas to be analyzed.

The other vessel 106 is closed and the gas it contains, for instance air, is at a temperature corresponding to that of the gas to be analyzed. Consequently, the pressure of the gas present in vessel 106 indicates the temperature of the gas to be analyzed.

The pressures existing respectively in vessel 105 and in vessel 106 are caused to act upon a differential manometer the positions of which indicate the density of the gas to be analyzed, since these positions depend upon the pressure and the temperature of this gas.

The differential manometer may be constituted by a mass 109 of mercury present in a U tube 110 the ends of which are connected, through conduits 111 and 112, respectively with vessel 105 and vessel 106.

In order to have resistance $R_v$ controlled by manometer 105—106, this resistance is advantageously constituted by a wire of platinum-iridium extending inside one of the two branches of tube 110. The higher the mercury column extends in this branch the lower the resistance and vice versa.

Advantageously, I insert in conduits 111 and 112, calcined glass plates 113 and 114 which are permeable to gases but not to mercury. Thus, shocks cannot project mercury into vessels 105 and 106.

An analyzer according to my invention could be used for analyzing liquids. Furthermore, the number of components might be greater than two, while still making use of a single amplifier. In this case, the switch above described would be arranged to couple one diaphragm condenser with the amplifier and to earth the other condensers.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A multiple analyzer which comprises, in combination, means for supplying two ray beams having at least approximately the same wavelength composition and the same intensity, a series of at least four chambers disposed one behind the other across the path of one of said beams, means for feeding the first and third chambers of said series with a sample of the mixture to be analyzed, the second chamber of said series containing one of the components of said mixture, and the fourth chamber of said series containing another component of said mixture, said second chamber containing that of these two components which requires, for correct analysis, a smaller thickness of said sample of mixture than the other component, this thickness being that of the first chamber, and said third chamber being of a thickness which, added up to the thickness of said first chamber, gives at least approximately the best possible thickness value for the absorption of the rays corresponding to the component present in said fourth chamber, a second series of chambers disposed one behind the other across the path of the second ray beam, this second series comprising at least fifth and sixth chambers containing the same components as the second and fourth chambers, respectively, but no mixture sample receiving chamber, and means for comparing the respective action on a given physical factor, resulting from the amount of rays absorbed by the contents of said first and third chambers, between said second and fifth chambers and between said fourth and sixth chambers, respectively.

2. An analyzer according to claim 1 in which said first and third chambers of the first series are connected together so that a stream of the mixture to be analyzed flows successively through said first and third chambers.

3. An analyzer according to claim 1 in which the respective thicknesses $d_1$, $d_2$ of said first and third chambers of the first series are such that the products $k_1.c_1.d_1$, $K_2.C_2$ $(d_1+d_2)$ are approximately the same for said respective chambers, $k_1$, $k_2$ being the coefficients of absorption of the respective gas components, and $c_1$, $c_2$ the maximum concentrations of these gases in the gaseous mixture to be analyzed.

4. An analyzer according to claim 1 in which the last mentioned means are constituted by diaphragm condensers, each condenser including a container, a diaphragm partition dividing said vessel in two portions connected respectively to one component containing chamber of the first series and to the chamber of the second series which contains the same gas component, and two armatures, one fixed and the other constituted by said diaphragm partition, a common amplifier, and a switch arranged to connect any of said condensers with said amplifier while cutting off the other condensers from said amplifier.

5. An analyzer according to claim 1 in which the last mentioned means are constituted by diaphragm condensers, each condenser including a container, a diaphragm partition dividing said vessel in two portions connected respectively to one component containing chamber of the first series and to the chamber of the second series which contains the same gas component, and two armatures, one fixed and the other constituted by said diaphragm partition, a common amplifier, and a switch arranged to connect any of said condensers with said amplifier while cutting off the other condensers from said amplifier, one armature of every condenser being constantly connected with the input of said amplifier, and said switch being adapted to connect the other armature of this condenser either with the feed of the amplifier or with the earth.

6. An analyzer which comprises, in combination, means for supplying two ray beams having at least approximately the same wavelength composition and the same intensity, at least two chambers disposed behind each other across the path of one of said beams, to wit successively one chamber containing a sample of the gas to be analyzed and one receiving chamber containing an active gas constituted by a component of this gas, a receiving chamber containing this component disposed across the path of the second beam, a differential electric device, responsive to the respective actions of the gases contained in said two receiving chambers, an electric indicator, a circuit connecting said device with said indicator, a shunt system inserted in said circuit across said indicator, a resistance in said shunt system variable in response to variations of the density of the sample gas, an auxiliary voltage source connected with said circuit and means for varying the voltage fed from said auxiliary source to said circuit in response both to the difference between the actual density of said sample gas and a predetermined normal density and to the value of the concentration of said component in said sample gas corresponding to the zero of the scale of said indicator.

7. An analyzer which comprises, in combination, means for supplying two ray beams having at least approximately the same wavelength composition and the same intensity, at least two chambers disposed behind each other across the path of one of said beams, to wit successively one chamber containing a sample of the gas to be analyzed and one receiving chamber containing an active gas constituted by a component of this gas, a receiving chamber containing this component disposed across the path of the second beam, a differential electric device, responsive to the respective actions of the gases contained in said two receiving chambers, an electric indicator, a circuit connecting said device with said indicator, a Wheatstone bridge including, in one of its branches, a resistance variable in response to variations of the density of the sample gas, the ends of one diagonal of said bridge being connected to said circuit across said indicator, an auxiliary voltage source inserted in the other diagonal of said bridge and means for varying the voltage fed from said auxiliary source to said circuit in response both to the difference between the actual density of said sample gas and a predetermined normal density and to the value of the concentration of said component in said sample gas corresponding to the zero of the scale of said indicator.

8. An analyzer according to claim 7 further including a resistance inserted in series with said auxiliary voltage source in said second mentioned diagonal of the bridge.

9. A multiple analyzer which comprises, in combination, means for supplying two ray beams having at least approximately the same wavelength composition and the same intensity, a series of at least four chambers disposed one behind the other across the path of one of said beams, means for feeding the first and third chambers of said series with a sample of the mixture to be analyzed, the second chamber of said series containing one of the components of said mixture, and the fourth chamber of said series containing another component of said mixture, said second chamber containing that of these two components which requires, for correct analysis, a smaller thickness of said sample of mixture than the other component, a second series of chambers disposed one behind the other across the path of the second ray beam, this second series comprising at least fifth and sixth chambers containing the same components as the second and fourth chambers, respectively, but no mixture sample receiving chamber, and means for comparing the respective action on a given physical factor, resulting from the amount of rays absorbed by the contents of said first and third chambers, between said second and fifth chambers and between said fourth and sixth chambers, respectively.

References Cited in the file of this patent

UNITED STATES PATENTS

| | | |
|---|---|---|
| 1,354,681 | Okey | Oct. 5, 1920 |
| 1,527,597 | MacMichael | Feb. 24, 1925 |
| 2,431,019 | Barnes | Nov. 18, 1947 |
| 2,462,995 | Ritzmann | Mar. 1, 1949 |
| 2,570,064 | Meinert | Oct. 2, 1951 |
| 2,605,426 | Martin | July 29, 1952 |
| 2,621,297 | Obermaier | Dec. 9, 1952 |
| 2,642,536 | Heigl | June 16, 1953 |

FOREIGN PATENTS

| | | |
|---|---|---|
| 645,576 | Great Britain | Sept. 22, 1949 |

OTHER REFERENCES

Journal of Scientific Instruments, Dec. 1946, vol. 23, pp. 293–301.